United States Patent [19]
Schwitalla

[11] Patent Number: 5,207,239
[45] Date of Patent: May 4, 1993

[54] VARIABLE GAIN SERVO ASSIST

[75] Inventor: J. David Schwitalla, Hermosa Beach, Calif.

[73] Assignee: Aura Systems, Inc., El Segundo, Calif.

[21] Appl. No.: 921,932

[22] Filed: Jul. 29, 1992

Related U.S. Application Data

[63] Continuation-in-part of Ser. No. 738,193, Jul. 30, 1991, Pat. No. 5,135,070.

[51] Int. Cl.$^5$ .............................................. B62D 5/08
[52] U.S. Cl. ................................... 137/115; 180/142; 180/143; 60/421; 137/870
[58] Field of Search ................... 74/881; 180/132, 141, 180/142, 143, 79.1, 79.3; 60/421, 422, 427, 429; 137/596, 625.69, 870, 625.61, 625.64, 115

[56] References Cited

U.S. PATENT DOCUMENTS

| | | | |
|---|---|---|---|
| 3,692,137 | 9/1972 | Inoue | 137/625.61 X |
| 3,870,077 | 3/1975 | Nakamura | 137/614.11 |
| 4,600,071 | 7/1986 | Kitahara et al. | 180/53.1 |
| 4,632,638 | 12/1986 | Shibayama et al. | 137/625.69 X |
| 4,637,482 | 1/1987 | Ohashi | 180/132 |
| 4,694,927 | 9/1987 | Nagae | 180/132 |
| 4,730,688 | 3/1988 | Hasegawa | 180/145 |
| 4,757,980 | 7/1988 | Schubert | 267/139 |
| 4,793,433 | 12/1988 | Emori et al. | 180/143 |
| 4,899,842 | 2/1990 | Emori et al. | 137/625.69 X |
| 4,912,343 | 3/1990 | Stuart | 310/14 |
| 4,913,250 | 4/1990 | Emori | 180/79.1 |
| 4,926,906 | 5/1990 | Ichihashi et al. | 137/625.69 X |
| 4,940,103 | 7/1990 | Momiyama | 180/132 |

Primary Examiner—Leslie A. Braun
Assistant Examiner—William O. Trousdell
Attorney, Agent, or Firm—Anthony T. Cascio; Lisa A. Clifford

[57] ABSTRACT

A variable gain control apparatus for a servo assist system includes a position sensor, a valve, a controller and an actuator. The valve has an actuated member and a variable flow orifice to communicate hydraulic fluid between the high pressure supply line and a reservoir of hydraulic fluid. The position of the actuated member determines the cross sectional area of the variable flow orifice. The position sensor determines the present position of the actuated member. The controller determines a position error between the present position of the actuated member and a varying predetermined position of the actuated member. The actuator in response to the position error actuates the actuated member to eliminate the position error so that assist pressure to the servo assist system is varied as a function of the varying predetermined position.

17 Claims, 6 Drawing Sheets

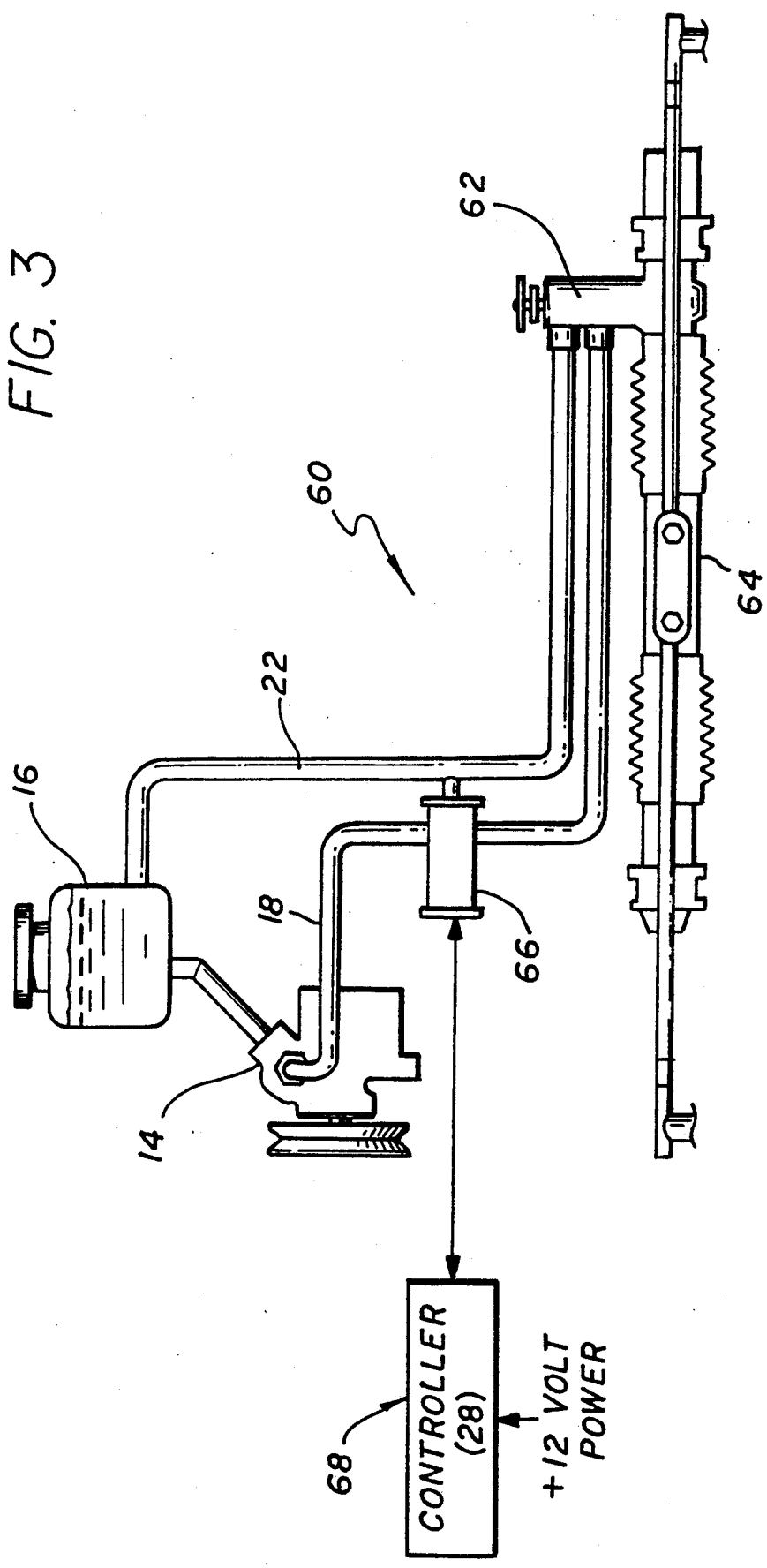

VARIABLE GAIN SERVO ASSIST

RELATED APPLICATION DATA

The present application is a continuation-in-part of commonly owned, co-pending application, U.S. Ser. No. 07/738,193, filed Jul. 30, 1991, now U.S. Pat. No. 5,135,070.

FIELD OF THE INVENTION

The present invention relates generally to hydraulic servo assist systems and more particularly to variable gain control apparatus for such systems.

BACKGROUND OF THE INVENTION

A typical hydraulic power transmission system includes a pump to supply high pressure hydraulic fluid to a hydraulic valve. The valve controls the fluid pressure of the working hydraulic fluid supplied to a hydraulic actuator. The hydraulic actuator then develops an output force proportional to the pressure of the working fluid supplied thereto. These components form the high pressure side of the system. The output force of the actuator is useful to act on a load. Accordingly, the resultant force which acts on the load is determined by the valve orifice cross section area. The hydraulic fluid returns to a reservoir on the low pressure side of the system from which it may again be pumped.

The hydraulic actuator may provide the sole force acting on the load or may provide an assist force in addition to a mechanical force acting on the load. In this latter class of hydraulic power transmissions systems, commonly known as a hydraulic servo assist system, the force developed by the hydraulic actuator is developed commensurately with the sensed mechanical force acting on the load to provide a force or assist gain.

In the parent application hereto, U.S. Ser. No. 07/738,193, now U.S. Pat. No. 5,135,070, the entirety of which is incorporated herein by reference, a system for the active control of the pressure of the working fluid in the high pressure side of the hydraulic power transmission system is disclosed. The disclosed system is operable to control both the static pressure of the working fluid, so that a predetermined hydraulic force actuation profile or an assist gain profile is realized, and the dynamic pressure of the working fluid so that pressure fluctuations caused by external or internal influences are cancelled in real time.

It is to be understood and it will become apparent that the invention disclosed hereinbelow is also operable with any type of hydraulic power transmission system. To enable one skilled in the art to more fully appreciate the breadth and scope of the present invention, the unique aspects and limitations of the hydraulic servo assist system are set forth below to demonstrate the adaptability of the present invention to various types of hydraulic systems.

In the hydraulic servo assist system, a pump draws hydraulic fluid from a reservoir and pumps such fluid through a high pressure supply line to a hydraulic servo assist valve. Generally, as the mechanical apparatus acts on the load, the servo assist valve senses or detects the mechanical force presently acting on the load. The servo valve is actuated in response to sensed mechanical force with the magnitude of actuation, which determines a servo valve orifice cross sectional area, being commensurate with the mechanical force. As the servo assist valve is actuated, fluid pressure is allowed to build in a hydraulic actuator coupled to the load. The high pressure fluid in the hydraulic actuator provides a hydraulic force which is additive to the mechanical force acting on the load.

The pressure of the hydraulic fluid in the actuator, and hence the amount of hydraulic force provided, is determined by the quiescent or static pressure of the high pressure side of the system and the increase of pressure occurring as a result of servo valve actuation changing the servo assist valve orifice cross sectional area. On the low pressure side of the system, the fluid is returned from the servo assist valve and actuator to the reservoir through a low pressure return line.

Therefore, it is readily apparent that the hydraulic servo assist system provides a force gain to the mechanical actuation of the load. The servo assist gain is seen from the above to be a function of both the pressure of the hydraulic fluid in the high pressure supply line and the cross sectional area of the servo assist valve orifice, since these system variables determine the pressure of the hydraulic fluid acting on the load through the hydraulic actuator.

A motor vehicle power steering system is one particular example of the hydraulic servo assist system as described above. Actuation of the steering tires of the vehicle, which is the load referred to above, is provided primarily through a steering gear which couples driver input at the steering wheel to the tires with the hydraulic servo assist system providing the assist force to the steering gear while mechanical force is being imparted to the steering gear through the steering column. Although the construction of a motor vehicle servo assist power steering system is well know, the parameters and constraints on such system imposed by its operating environment have resulted in an elegant high performance system with a unique set of features and limitations, especially in pump and servo assist valve design. Accordingly, the general nature of these components is described for the convenience of the casual reader hereof.

Usually, the steering wheel is connected to the steering gear through a steering column and the steering gear is in turn connected to tie rods, each of which interconnects a respective one of the steerable spindle/hub assemblies of the vehicle suspension system to the steering gear. The spindle/hub assemblies are mounted for rotation through a prescribed arc about a king pin axis, as is well known. The steering tires are mounted to their respective spindle/hub assembly so that the rotation of the spindle/hub steers the tires. The function of the steering gear is to convert the rotation of the steering column to linear motion of the tie rods.

The rack and pinion type steering gear is presently in the most common use because of its simplicity, compact dimensions and directness of action. In this type of steering gear, the pinion meshes with an elongated rack so that rotation of the pinion is translated to linear displacement of the rack. In its simplest form, the pinion is carried at one end of the steering column and the tie rods are attached to the rack.

Other types of motor vehicle steering gears include the recirculating ball steering gear and the worm and roller steering gear. Any of these various types of steering gears may be provided with hydraulic servo assist to reduce steering effort required at the steering wheel to turn the steering tires during vehicle maneuvers. The design of the hydraulic servo assist system, and in particular the servo assist valve, may depend on the type of steering gear utilized.

The discussion hereinbelow will, for the sake of brevity and convenience, refer only to the rack and pinion type steering gear and the particular design constraints of the servo assist system imposed by such steering gear, since these designs are most commonly used. However, this discussion is not intended to limit the utility or scope of the present invention.

In the servo assist power steering system, the hydraulic pump is usually a conventional vane type pump which is belt driven from the engine crankshaft. The volume of hydraulic fluid moved by the vanes therefore increases with increasing engine speed. The engine speed dependence on the volume of fluid moved through the vanes would normally cause fluid pressure in the high pressure side of the hydraulic system also to be dependent on engine speed. However, the power steering assist system requires a generally stable steady state or static pressure in the high pressure side of the system over an indeterminately varying operating speed of the pump vanes. Therefore, a constant volume output flow is required by this system.

The constant output flow in turn requires that hydraulic fluid be continuously recirculated through both the high pressure and low pressure sides of the servo assist system, wherein the pressure drop occurs across the servo assist valve orifice, even when no useful work is being performed by the system. A restriction in the flow path, such as a decrease in the cross sectional area of the servo assist valve orifice without the corresponding actuation of the steering rack, would then cause excessive high pressure at the pump output. The typical pump used in servo assisted steering therefore includes both output flow regulation and output pressure regulation. Both of these functions are accomplished by flow control and pressure relief valves at the pump output.

The flow control valve is spring biased and is acted upon by the pressure of the fluid entering a venturi tube in opposition of the spring bias and also by the pressure of the fluid exiting the venturi tube in support of the spring bias. The venturi tube is located at the pump vane output to receive fluid. According to well known principles, the pressure of fluid exiting the venturi tube decreases as its flow increases. The net force acting on the flow control valve actuates this valve to return excessive flow from the output of the pump vanes prior to the fluid entering the venturi tube to the low pressure side of the system at either the pump input or reservoir.

The pressure relief valve is a spring biased check ball which unseats in response to excessive pressure of the fluid exiting the venturi tube. When the pressure relief valve opens, fluid exiting the venturi tube is returned to the low pressure side of the system, thereby reducing flow at the pump output and hence pressure. Both valves may also act in concert so that a relatively stable output flow is maintained.

The steering gear servo assist valve has three primary components, which are a first valve member, a second valve member, and a torsion bar. The torsion bar interconnects the first and second valve members and further provides an axis of relative angular displacement between each valve member. The first and second valve members are coaxially disposed with one valve member being radially disposed within the other valve member. One valve member is connected to the steering column and the second valve member, in turn, is connected to the pinion. The torsion bar thus provides the sole mechanical connection between the steering column and the pinion.

Normally, the first and second valve members are at their steady state position relative to each other which is defined as the position in absence of any torsional force in the torsion bar. In the steady state position, the fluid flow is continuous through the valve orifice between the high and low pressure sides of the system. The valve orifice is defined by an input opening in the first valve member and into a passage between the valve members. The passage diverts into two branches with each branch exiting the second valve member through a respective output opening. The servo assist valve also includes two channels, each of which communicates one branch of the valve orifice passage with a respective chamber on either side of a double acting piston, which functions as the hydraulic actuator. In the steady state position, each channel is equally open to the valve orifice passage. Fluid is introduced into or removed from either chamber only through the channel in communication therewith. The piston is connected to the steering rack.

Steering inputs at the steering wheel will, because of the torsion bar, cause relative angular displacement to occur between the first and second valve members. This relative angular displacement will cause one branch of the passageway to become restricted at its termination at its respective output opening in the second valve member and more open with respect to the input opening in the first valve member. Conversely, the other branch of the passageway becomes restricted to flow from the input opening in the first valve member and more open at its termination with its respective output opening in the second valve member. The effective cross sectional area of the servo assist valve orifice thus decreases during increasing relative angular displacement allowing pressure to build in the branch of the passageway restricted at its termination with the output opening of the assist valve while the pressure of the other branch decreases as it becomes more open to the output opening in greater communication to the low pressure side of the system. Accordingly, fluid pressure builds in the high pressure side of the system.

This pressure imbalance in each branch of the passageway is transferred to the chambers on each side of the actuator piston through the channels which communicate one branch with its respective chamber. As the piston moves from the high pressure chamber, the high pressure chamber expands receiving high pressure fluid from the channel in communication with the high pressure passageway and the low pressure chamber contracts pushing its fluid through the channel into the low pressure branch of the passageway. The piston thus converts the pressure differential in each branch of the passageway into a force acting on the steering rack.

The primary force acting on the steering rack is developed by steering inputs at the steering wheel and coupled through the torsion bar and pinion. As the servo assist valve members displace as described above, the force developed by the hydraulic actuator assist the mechanical force. This assist force then reduces the torsional force acting on the torsion bar thereby returning the servo assist valve to its steady state position.

The servo assist gain is primarily determined by the torsional stiffness of the torsion bar. As the torsion bar is made less stiff, the magnitude of the relative angular displacement of the servo valve members is greater at the initiation of a steering input than it would be if the bar is made torsionally stiffer. As described hereinabove, for increasing magnitude of relative angular displacement between the valve members, there is a corresponding increase of assist pressure developed in the branch of the valve passageway which is becoming more restricted at its termination. Accordingly, the hydraulic servo assist acting on the steering rack increases as the stiffness of the torsion bar decreases and vice versa.

The amount of servo assist, or the servo force gain, is selected to maintain "road feel" at the steering wheel. Usually, excessive assist or high gain diminishes road feel and insufficient assist or low gain causes unacceptably high steering effort. In a typical motor vehicle, required steering effort is at a maximum when the vehicle is at rest, and decreases with increasing vehicle speed. This effect is due to the decreasing rolling and scrub resistance of the tires as vehicle speed increases.

The above described servo assist system is useful for decreasing the amount of steering effort required when the vehicle is at rest or at very low vehicle speeds. However, as vehicle speed increases, the servo gain developed by the above system acting on the steering rack remains constant. This may result in excessive assist provided by the system at higher vehicle speeds, thereby degrading road feel at these speeds. However, road feel becomes even more important at higher speeds where the degree of steering control necessary for the operator of the vehicle to respond to various road situations, especially those which necessitate abrupt evasive maneuvers, increases. To maintain road feel at higher speeds, several types of prior art devices have been developed which function to decrease servo gain of the system as the speed of the vehicle increase.

A first prior art device, commonly referred to as an electronic variable orifice (EVO) system, modifies the flow rate of hydraulic fluid discharged from the engine driven hydraulic pump. The EVO system includes a restriction to the flow exiting the venturi tube. The restriction may be in the form of a pin which is disposed external to and coaxial with the exit orifice of the venturi tube. As vehicle speed increases, the pin is gradually inserted into the exit orifice thereby decreasing the effective cross sectional area of this orifice. The pin is actuated by an electronic speed sensing actuator.

The effect of the pin being inserted into the exit orifice of the venturi tube is to further decrease the pressure of the flow exiting the venturi tube, thereby causing increased actuation of the flow control valve. As the flow control valve, due to the presence of the pin, diverts additional flow from the output of the pump vanes prior to entering the venturi tube back to the low pressure side of the system, as described above, the flow exiting the pump and supplied to the servo assist valve accordingly is reduced. The reduced flow, when the servo valve members are displaced, will result in a reduced pressure buildup in the restricted branch of the valve orifice passageway. The reduced pressure buildup thus reduces the servo assist force developed by the hydraulic actuator, and hence the servo gain of the system.

A disadvantage and limitation of the the EVO system is that assist gain is variable over a limited range of assist pressures. For example, at low assist pressure the output flow of the pump may become insufficient to effectively build pressure in the restricted branch of servo assist valve passageway, thereby not allowing sufficient servo force to act on the steering rack to return the servo valve to its steady state position. Another disadvantage and limitation is that the EVO system at reduced flow rates may not respond effectively to sudden transient maneuvers occurring in rapid succession, such as a swerve from and a recovery to a traffic lane to avoid an object. This lack of response is again due to the reduced flow through the servo valve wherein assist pressure may not build quickly enough to provide initial assist to the maneuver. The effect is that the driver senses a delay in assist or a pulsing of the steering wheel.

A second prior art device utilizes a reaction chamber in conjunction with the servo assist valve. The reaction chamber receives increasing amount of hydraulic fluid as vehicle speed increases. The fluid in the reaction chamber acts against a spring bias. As the spring bias is overcome, the reaction chamber actuates a mechanical gripping or clutching apparatus which is operative to limit increasingly with increasing vehicle speeds the total magnitude of relative angular displacement between the first valve member and the second valve member of the servo assist valve. Such mechanical action may be typically achieved by V-shaped detents which receive steel balls which are urged into the detents by action of the reaction chamber. Eventually, the first valve member and the second valve member become completed locked together so that servo assist is completely removed from the system.

The second prior art device does not exhibit the same problems of the above described EVO system. However, a disadvantage and limitation of the second type of prior art device is that it significantly increases the mechanical complexity of the servo assist valve and the number of precision manufacturing steps which need be performed to manufacture the reaction chamber and clutch actuator. In the highly cost competitive automobile industry, this type of device may only find limited usefulness in certain high end vehicles. The EVO system may be more suitable to the broad price range spectrum of vehicles.

Yet a third type of prior art system also utilizes a reaction chamber which receives hydraulic fluid in response to increasing vehicle speeds. However, instead of restricting the relative angular displacement of the servo valve, the reaction chamber is used to introduce a resistive or frictional force on the steering column itself so that the operator of the motor vehicle senses greater steering effort.

The third type of prior art device is very simple and of low cost. However, a significant disadvantage and limitation of the this device is that the introduction of a resistive force on the steering column may result in an artificial steering feel as sensed by the driver and a lack of refinement in the steering system. Accordingly, this device may find limited usefulness only at the extreme low end of the vehicle cost spectrum.

SUMMARY OF THE INVENTION

Accordingly, it is an object of the present invention to provide a variable gain control apparatus for a hydraulic servo assist system.

It is a further object of the present invention to provide such a variable gain control apparatus particularly adapted for use with a conventional motor vehicle servo assist system.

It is yet another object of the present invention to provide such a variable gain control apparatus which is producible in mass quantities and competitive on cost and level of performance compared to the above described prior art devices.

According to a broad aspect of the present invention, a variable gain control apparatus for a servo assist system includes a valve and an actuator. The valve has an actuated member and a variable flow orifice. The position of the actuated member determines the cross sectional area of the variable flow orifice. The variable flow orifice communicates hydraulic fluid between a high pressure side and a low pressure side of a hydraulic servo assist system. As a result of a small amount fluid being bled through the orifice, the high pressure side has an operating pressure determined as a function of the cross sectional area of the variable flow orifice. The actuator in response to a present state of variable conditions in the environment of the servo assist system actuates the actuated member to a position at which the cross sectional area of the variable orifice has a dimension to establish the operating pressure substantially at a value preselected to exist upon the occurrence of the present state of the variable conditions. Therefore, assist pressure developed by the servo assist system becomes a function of the area of the variable flow orifice.

In one aspect of the present invention, an electrical signal is developed as a function of vehicle speed. For example, as vehicle speed increases, the output signal may accordingly increase. This signal will cause the electromechanical actuator to move the actuated member so that the valve orifice becomes larger with increasing signal level. As flow through the variable orifice increases, the pressure of the high pressure side of the assist system accordingly decreases. The amount of servo assist pressure developed within the restricted branch of the servo assist valve passageway, and hence the assist gain, will be accordingly reduced as the flow through the variable orifice is increased with increasing vehicle speed. Of course, this result may be achieved with other polarities and biasing of the above elements.

In yet another aspect of the present invention, a position control loop may be added to the above elements. The position control loop includes a position sensor to sense the present position of the electromechanical actuator or valve member. The sensor develops a signal which is combined with the above signal indicative of vehicle speed or any other signal developed as a function of the present state of other variable conditions.

An important feature of the present invention is that the variable assist gain control apparatus acts to control in real time the pressure of the hydraulic fluid within the high pressure side of the servo assist system. This is achieved by bleeding a small amount of the total available regulated flow of the hydraulic pump from the high pressure side to the low pressure side. This advantageously contrast to the prior art EVO device which decreases the total output flow of the pump resulting in the above described disadvantages and limitations.

Another important feature of one particular embodiment of the present invention is the closed loop positioning of the movable valve member. The closed loop positioning possesses many advantages over the prior art. For example, closed loop positioning greatly enhances the accuracy of the controlled valve orifice area and ultimately the level of system performance. Resolution of closed loop positioning is infinite within the limits of travel resulting in infinitely variable assist gain. Furthermore, the closed loop positioning achieves a highly refined level of performance without mechanical complexity, precision manufacturing or excessive cost.

Other advantages of closed loop positioning are the immunity to vibrations and perturbations, immunity to installation orientation, immunity from ambient temperature, immunity from changes in fluid viscosity, and immunity from aging of components.

These and other objects, advantages and features of the present invention will become readily apparent to those skilled in the art from a study of the following Description of an Exemplary Preferred Embodiment when read in conjunction with the attached Drawing and appended Claims.

BRIEF DESCRIPTION OF THE DRAWING

FIG. 3 is a schematic diagram of a motor vehicle hydraulic assist steering system incorporating the pressure control system of FIG. 1;

DESCRIPTION OF AN EXEMPLARY
PREFERRED EMBODIMENT

Figure 1:
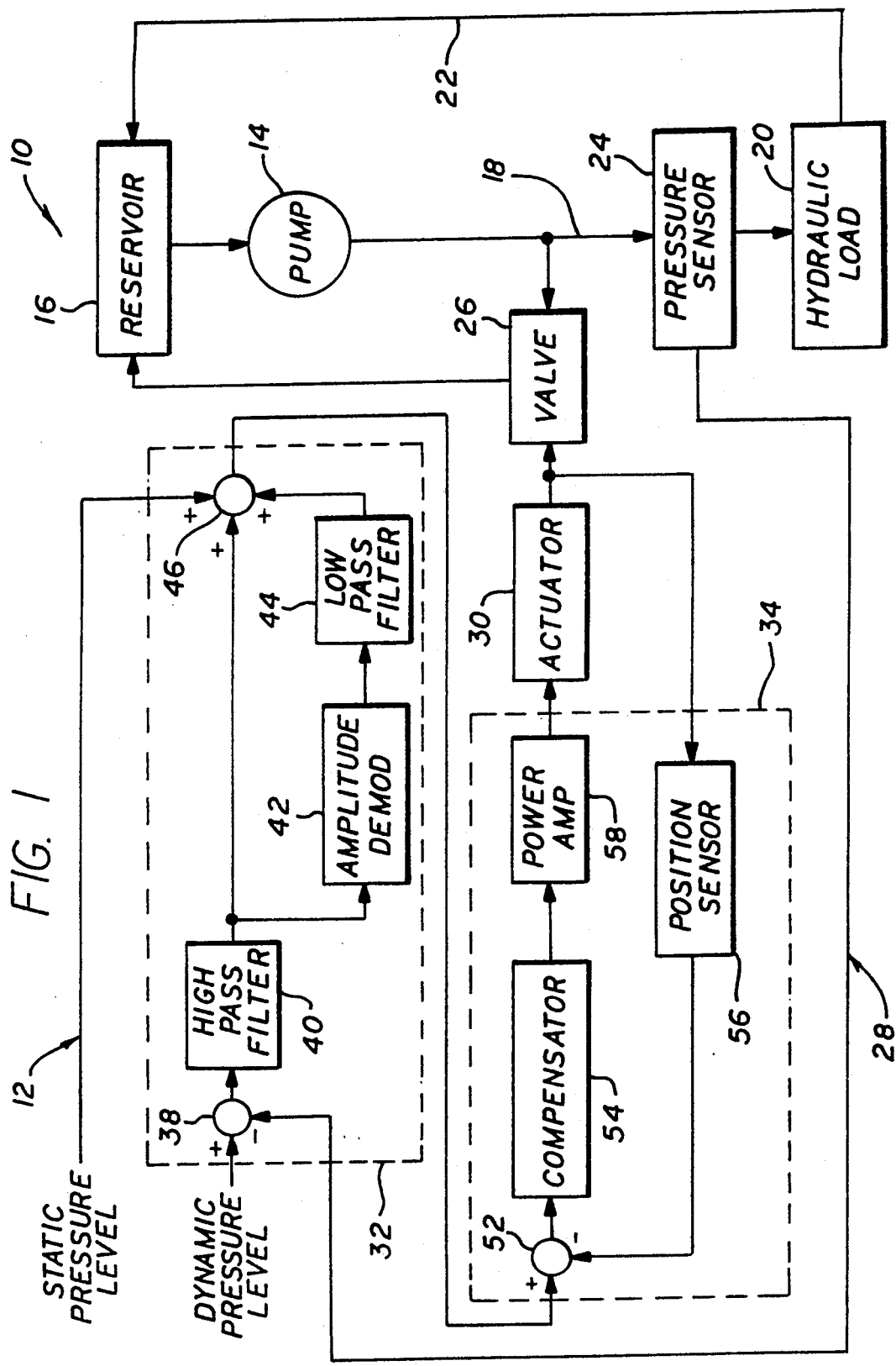
FIG. 1 is a block diagram of an active hydraulic pressure control system for a hydraulic fluid power transmission system or a hydraulic fluid servo assist system.

Referring to FIG. 1, there is shown a hydraulic fluid power transmission system 10 incorporating an active hydraulic pressure control system 12 which is constructed according to the principles of the present invention. The power transmission system 10 includes a hydraulic pump 14, a reservoir 16, a high pressure supply line 18, a hydraulic fluid load 20 and a return line 22. The pump 14 supplies hydraulic fluid from the reservoir 16 through the high pressure supply line 18 to the load 20 at which the high pressure fluid performs useful work usually through a hydraulic valve and actuator as is well known in the art. After the fluid in the load 20 performs such work, the hydraulic fluid is returned to the reservoir 16 through the low pressure return line 22.

The active hydraulic pressure control system 12 includes a sensor 24, a valve 26, a controller 28 and an actuator 30. In accordance with the broad aspect of the present invention, the controller 28 determines a pressure differential between the pressure sensed by the sensor 24 and a predetermined pressure. In response to such pressure differential, the actuator 30 drives the valve 26 which has a variable flow orifice to communicate hydraulic fluid between the high pressure supply line 18 and the reservoir 16, as best seen in FIG. 1, to eliminate the pressure differential. Generally, the controller 28, the valve 26 and the actuator 30 are arranged so that the hydraulic fluid flow through the variable orifice is increased or decreased in response to the pressure differential being positive or negative, respectively. For example, the instantaneous pressure in the supply line 18 is excessive, the actuator 30 is commanded by the controller 28 to open the valve 26 such that the flow through its orifice is increased effectively to bleed off the excess energy in the high pressure fluid.

To command the actuator 30, the controller 28 includes a flow control circuit 32 and a position control circuit 34. The flow control circuit 32 is responsive to a sensed pressure electrical signal and a predetermined pressure electrical signal to develop a first command signal as a function of each of the above sensed and predetermined pressure signals. The position control circuit 34 is responsive to the first command signal and a sensed actuator position electrical signal to develop a second command signal as a function of each of the first command and actuator position signals. The second command signal is applied to the actuator 30 to actuate the valve 26 to effect the active pressure control. The pressure sensor 24 transduces hydraulic fluid pressure to develop the sensed pressure signal.

More particularly, the flow control circuit 32 includes a subtracter 38 and a high pass filter 40. The subtracter 38 develops an error signal as a difference between the predetermined pressure signal and the sensed pressure signal. The high pass filter 40 develops a first filtered electrical signal from the error signal. The first command signal, described hereinabove, is linearly commensurate with the first filtered signal. In one particular embodiment of the present invention, the high pass filter 40 has a cutoff frequency above the desired bandwidth of the hydraulic pressure response in the power transmission system 10.

The flow control circuit 32 further includes an amplitude demodulator 42, a low pass filter 44 and a summer 46. The demodulator 42 develops a demodulated signal from the first filtered signal to extract amplitude information therefrom. The low pass filter 44 develops a second filtered signal from the demodulated signal. The summer 46 develops the hereinabove described first command signal as a summation of the first filtered signal and the second filtered signal. The low pass filter 44 has a cutoff frequency selected to remove high frequency noise from the demodulated signal.

Figure 2:
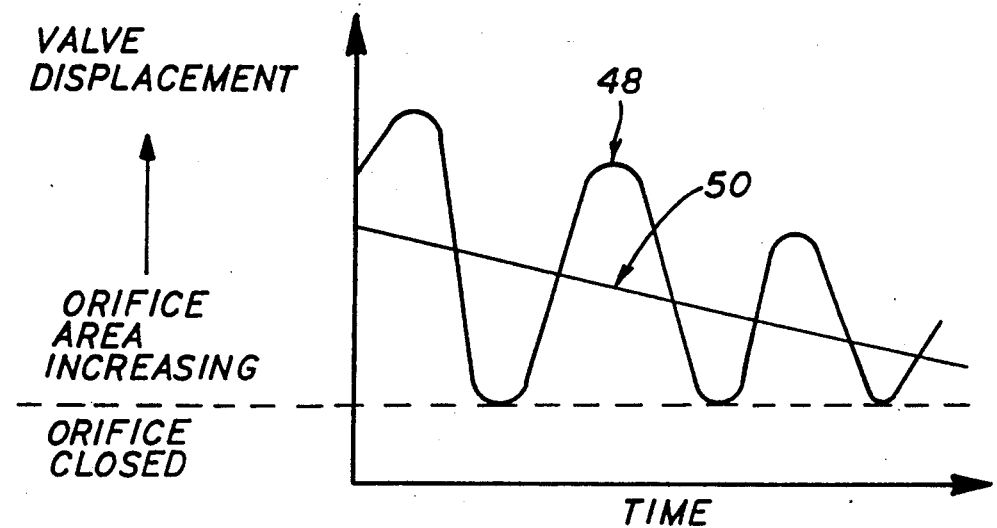
FIG. 2 diagrammatically illustrates the operation of a portion of the flow control circuit of FIG. 1.

With further reference to FIG. 2, there is shown a diagram of the effective cross sectional area of the variable flow orifice of the valve 26 to demonstrate the effects the first command signal developed by the flow control circuit 32 has on the effective cross sectional area when plotted as a function of time. When the first filtered signal from the high pass filter 40 is summed at the summer 46 with the second filtered signal from the low pass filter 44, the first command signal will thus have two separate components. These components are a dynamic signal component and a static (or bias) signal component. When the actuator 30 is a linear electromagnetic actuator of known construction, these signal components will linearly effect the effective cross sectional area of the variable flow orifice of the valve 26. Accordingly, the dynamic component relates to a dynamic displacement 48 of the valve 26 and the static component relates to a static displacement 50 of the valve 26, wherein displacement relates to the change of the effective cross sectional area of the variable flow orifice, as best seen in FIG. 2.

More particularly, the dynamic displacement 48 relates to the total change in the variable flow orifice cross sectional area, and the static displacement 50 relates to the static orifice cross sectional area as measured from a fully closed condition. Without the inclusion of the demodulator 42, the valve 26 would have its orifice cross sectional area oscillated about its closed position to provide active pressure control in accordance with the present invention.

However, the inclusion of the demodulator 42 adds a static or bias displacement, shown as displacement 50, to the dynamic displacement 48. In this configuration, the valve 26 will only close when there is little or no input signal. Since the static displacement 50 is linearly proportional to the amplitude of the first filtered signal, the valve 26 is allowed to remain open when needed and to be closed when inactive. Furthermore, the valve 26 can only reduce hydraulic pressure in the supply line 18 and not increase it. Therefore, it is desirably, in one particular embodiment of the present invention to keep the valve 26 open to effect the system 10 continuously. The demodulator 42 accomplishes this result to increase the overall effectiveness of the valve 26 in the hydraulic power transmission system 10.

In the above described embodiment of the present invention, the predetermined pressure signal applied to the subtracter 38 is derived commensurately with a predetermined desired dynamic pressure in the high pressure supply line 18. It is also contemplated that a second predetermined pressure signal may be applied to the summer 46. This second predetermined pressure signal will control the static pressure in the high pressure supply line 18 by control orifice cross sectional are as described above, and is accordingly developed commensurately with a predetermined static pressure. In some applications, which will be described in greater detail hereinbelow, it is highly desirable to modulate static pressure as conditions or environment at the load 20 change.

Continuing with the description of the controller 28, the position control circuit 34 includes a subtracter 52 and a compensator 54. The subtracter 52 develops a second error signal as a difference between the first command signal, described hereinabove, and the sensed position signal. The compensator 54 develops a third filtered signal from the second error signal. The second command signal is linearly commensurate with the third filtered signal. A position sensor 56 transduces position of the actuator 30 to the sensed position signal. The position control circuit 34 may also include a power amplifier 58, as needed, to develop the second command signal from the third filtered signal.

The compensator 54 performs conventional PID compensation as is known in position control loops. The PID compensation may be proportional, integral or differential functions, or any combination of these. The selection is determined by the choice of actuator 30 and valve 26.

Figure 4:
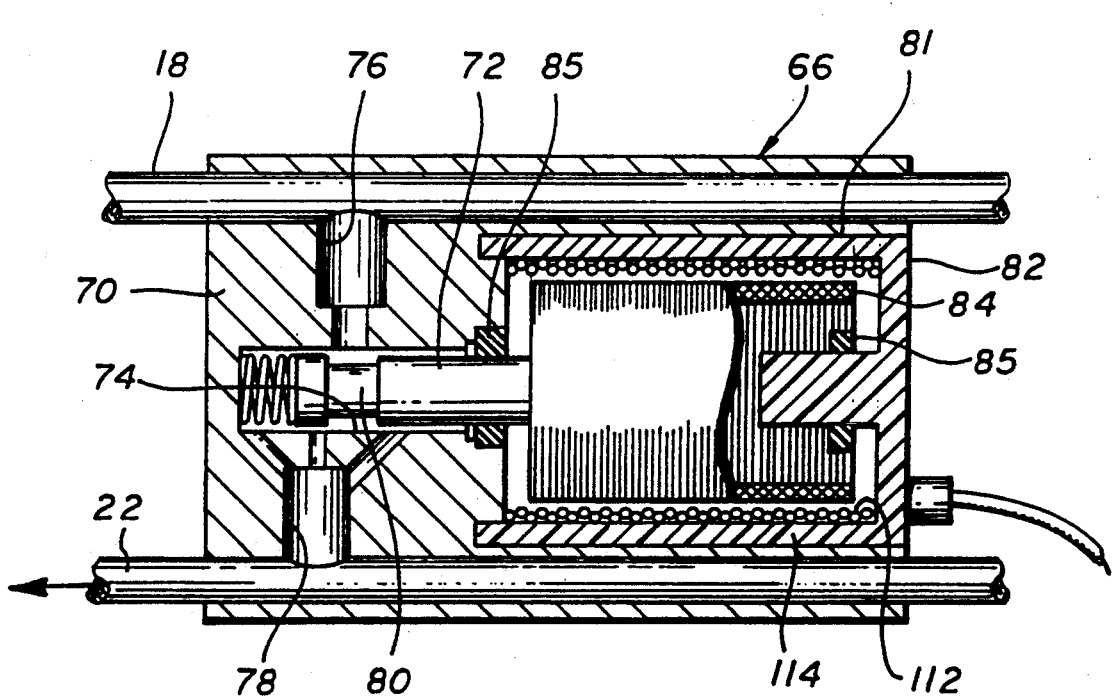
FIG. 4 is a portion of FIG. 3 shown in greater detail in one particular embodiment thereof.

With further reference to FIG. 3 and FIG. 4, the utility of the above described active pressure control system 12 with respect to one contemplated use in a motor vehicle power steering assist system 60 is described. The steering assist system 60 includes the pump 14, the reservoir 16, the high pressure supply line 18 and the return line 22, similarly as described hereinabove with respect to the hydraulic power transmission system 10. In the power steering system 60, however, the load 20 is a hydraulic servo assist 62 acting on a steering gear 64, as is well known.

The pressure sensor 24, the valve 26 and the actuator 30 may be assembled into a module 66, a best seen in FIG. 4 for connection to the high pressure line 18 and the return line 22. The controller 28 may be constructed on a circuit card 68 remote from the module 66. In this particular application, the valve 26 is preferably a spool valve having a valve body 70, which is formed from the housing of the module 66, and a spool 72. The valve body 70 has a cylindrical bore 74 closed at one end thereof, an inlet opening 76 to communicate hydraulic fluid from the supply line 18 to the bore 74, and an outlet opening 78 to communicate hydraulic fluid from the bore 74 to the reservoir 16 which may be through the return line 22. The spool 72 is received in axially slideable engagement within the bore 74 and has an annular channel 80. The channel 80, the inlet opening 76 and the outlet opening 78 are each disposed with respect to each other such that during axial movement of the spool 72 along its total stroke, the inlet opening 76 communicates with the bore 74 through the annular channel 80. The annular channel 80 is varied in communication with the outlet opening 78 thereby effectively modulating its cross sectional area to vary flow of hydraulic fluid therethrough.

In the embodiment of FIG. 4, the actuator 30 is a linear electromagnetic actuator 81. The actuator 81 has a core 82 and a coil 84 to which the second command signal from the controller 28 is applied. The coil 84 is further mechanically coupled directly to the spool 72 in the module 66 in the presently described embodiment of the invention. In the linear actuator 81, the force acting on the coil 84 is linearly proportional to the amplitude of the second command signal which induces a current in the coil 84. The spool 72 and coil 84 are aaxially slideable on bearings/seals 85. The spool valve and actuator 81 are chosen for their linear behavior so that the components of the first command signal as described in conjunction with FIG. 2 may linearly displace the spool to effect the displacement curves 48, 50 as described. The linear actuator 81 may be of the type described in any of U.S. Pat. No. 4,912,343, U.S. Pat. No. 5,099,158, commonly owned, copending application U.S. Ser. No. 07/807,123, filed Dec. 13, 1991, or commonly owned, copending application U.S. Ser. No. 07/855,771, filed Mar. 23, 1992.

As described in the above referenced U.S. Ser. No. 07/807,123, the core 82 includes a field coil 112 and a magnetic flux material case 114. A DC current within the field coil 112 will develop magnetic flux within the case and radially across the gap in which the movable coil 84 is disposed. The magnetic flux developed by the field coil 112 may also be developed by a cylindrical radially polarized permanent magnet, as described in the above referenced U.S. Pat. No. 4,912,343, U.S. Pat. No. 5,099,158 or U.S. Ser. No. 07/855,771, in substitution for the field coil 112.

In the application of the active hydraulic pressure control system 12 to the steering assist system 60, the first predetermined pressure signal is commensurate with the desired dynamic pressure as discussed hereinabove. Furthermore, the second predetermined pressure signal may be varied with vehicle road speed to provide a static or bias pressure within the steering assist system 60 to realize speed sensitive variable hydraulic assist. It is desirable to decrease assist as road speed increases since steering effort is generally greatest when a vehicle is stationary and at very low speeds during parking. Steering effort then decreases with increasing speed. At sufficiently high speeds, little or no assist is needed. The second or static pressure signal will readily allow for such biasing. The static pressure signal may also be developed as a function of the present state of one or more other variable conditions, such as steering wheel angle, rate of change of steering wheel angle or other conditions which affect steering response.

In some applications dynamic pressure transients are minimal or otherwise are of no concern, and therefore it would not be necessary to provide active pressure sensing of the hydraulic fluid within the high pressure supply line 18. However, it would still be desirable to provide variable assist gain control of the servo assist system described above. For example, it was described hereinabove that the second or static pressure signal could be varied in response to the present state of external variable conditions to provide for variable assist pressure acting on the hydraulic load 20. It is clear from FIG. 1 that removing the dynamic flow control circuit 32 from the system 10 results in the static pressure signal being the sole input to the position control circuit 34. In the example given above in conjunction with the steering assist system 60, the static pressure signal may be varied with road speed to achieve variable assist.

Figure 5:
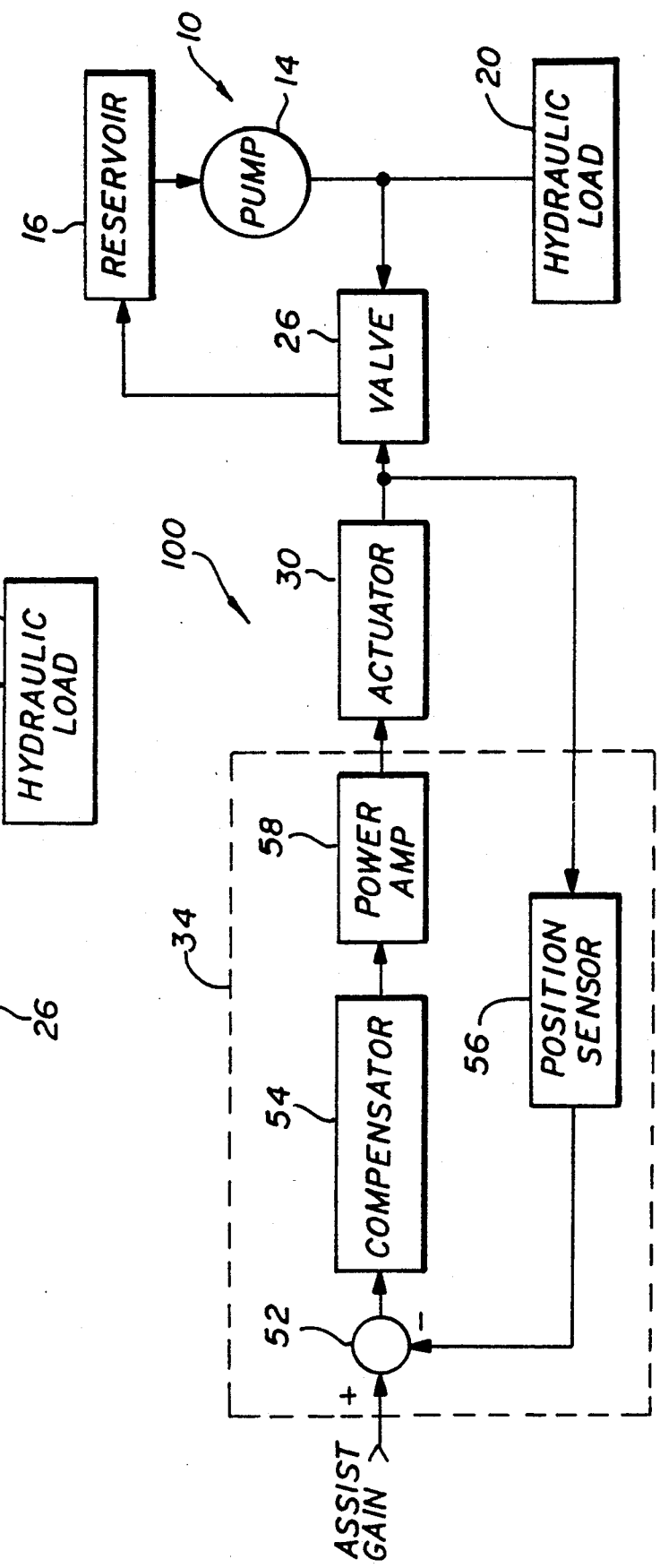
FIG. 5 is a block diagram of a closed loop variable assist gain control apparatus for a hydraulic fluid servo assist system.

Referring to FIG. 5, this variable assist may be achieved from a closed loop variable assist gain control apparatus 100 used with the hydraulic power transmission system 10 of FIG. 1 or, specifically, with the above described motor vehicle servo assist system 60 of FIG. 3. The gain control apparatus 100 is identical to the above described position control circuit 34. As suggested above, the static pressure level signal of FIG. 1 may be used as the sole component to the +input of the subtracter 52, in which case such signal may also be referred to as the assist gain signal.

Figure 6:
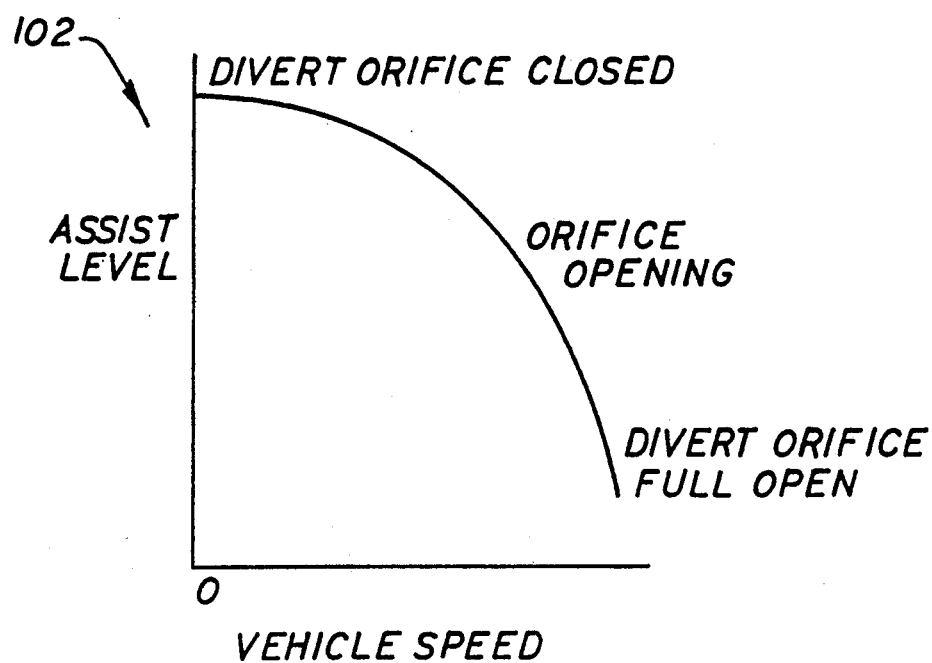
FIG. 6 diagrammatically illustrates the assist gain input to the variable assist gain control apparatus of FIG. 5.

As stated above, the assist gain signal may be developed as a function of road speed, steering wheel angle, rate of change of steering wheel angle or any combination of these as is known in the art. In FIG. 6, a graph 102 is one example of assist gain signal amplitude, plotted on the ordinate, vs. road speed, plotted on the abscissa. It is within the ordinary skill in the art to develop a signal plotted as in FIG. 6 or as a function of the other variable conditions. In many vehicles, this signal may already be provided by the vehicle or engine control computer system. The polarity and amplitude of the assist gain signal is chosen so that the actuator displaces a movable valve member of the valve 26 so that the cross sectional area of the variable flow orifice increases with decreasing levels of servo assist.

Figure 7:
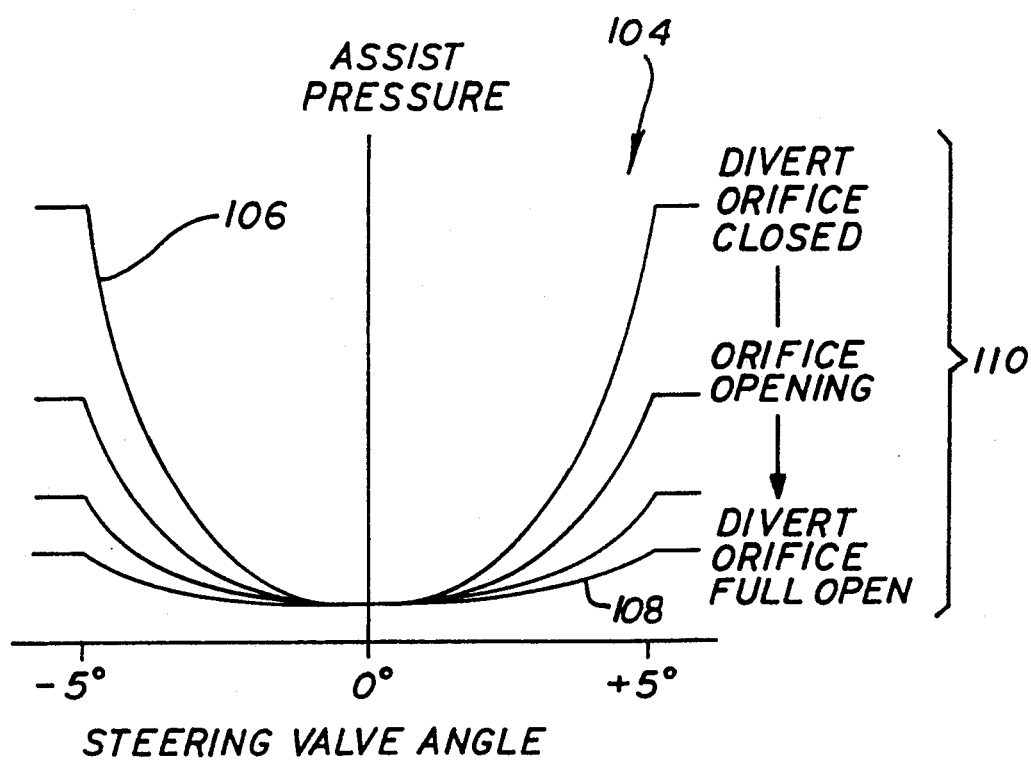
FIG. 7 diagrammatically illustrates the operation of the variable assist gain control apparatus of FIG. 5.

The operation of the variable assist gain control apparatus may be understood with reference to a graph 104 shown in FIG. 7 which plots assist pressure developed in the hydraulic servo assist 62 on the ordinate against valve angle of the typical power steering servo assist valve, as described above in reference to the background art, on the abscissa. A curve 106 illustrates assist pressure when the valve orifice of valve 26 is at a minimum allowing no fluid, or relatively minute quantities of fluid, to be bled from the high pressure side of the servo assist system 60 to the low pressure side of the servo assist system 60. A curve 108 illustrates assist pressure when the valve orifice of valve 26 is at a maximum, allowing a maximum predetermined quantity of fluid to be bled from the high pressure side of the servo assist system 60 to the low pressure side of the servo assist system 60. Curve 106 and curve 108 define the upper and lower extremes for a family of curves 110 which depend on the cross sectional area of the valve orifice of the valve 26.

As the effective cross sectional area of the servo assist valve within the hydraulic servo assist 62 becomes smaller as valve angle of the servo assist valve increases, the pressure of the high pressure side of the servo assist system 60 builds due to the output flow of the pump 14. This relationship may be described as $$P(a_1) = Q^2/K^2 A_1^2 \qquad (1)$$

wherein P is the pressure of the high pressure side of the servo assist system 60, Q is the output flow of the pump 14, $A_1$ is the cross sectional area of the servo assist valve of the servo system 60 and K is the hydraulic fluid viscosity constant. Since P increases with decreasing $A_1$ and $A_1$ decreases with increasing valve angle of the servo assist valve in the servo assist 62, the shape of the curve 106 is obtained when the cross sectional area of the valve 26, hereinafter denoted by $A_2$, is closed or at a minimum.

As the valve 26 is opened, the cross sectional area $A_2$ of its orifice increases. The total area, denoted hereinafter as $A_T$, exposed to the output flow of the pump 14 may be expressed as $$A_T = A_1 + a_2. \qquad (2)$$

As the area $A_2$ increases, the assist pressure in the high pressure side of the servo assist system 60 decreases in accordance with Eq. (1) and Eq. (2) as follows $$P(a_T) = Q^2/K^2 (A_1 + A_2)^2. \qquad (3)$$

Taking a ratio of Eq. (1) to Eq. (3), and further assuming Q is constant in the motor vehicle assist system 60, this ratio becomes $$P(A_1)/P(A_T) = A_1/(A_1 + A_2). \qquad (4)$$

Therefore, Eq. (4) states that the assist pressure, P, as seen in the family of curves 110 can be controlled as a function of the cross sectional area, $A_2$, of the valve orifice of valve 26. It is apparent to those skilled in the art that the pressure, P, is infinitely variable between the maximum shown at 106 and the minimum shown at 108 and not limited to the discrete curves 110 of FIG. 7 which are shown for purposes of clarity.

In the above described embodiments, the actuator 30 has been described as a linear actuator 81 wherein the output force is proportional to the input current. Other type of nonlinear electromagnetic actuators may also be used for the actuator 30.

Figure 8:
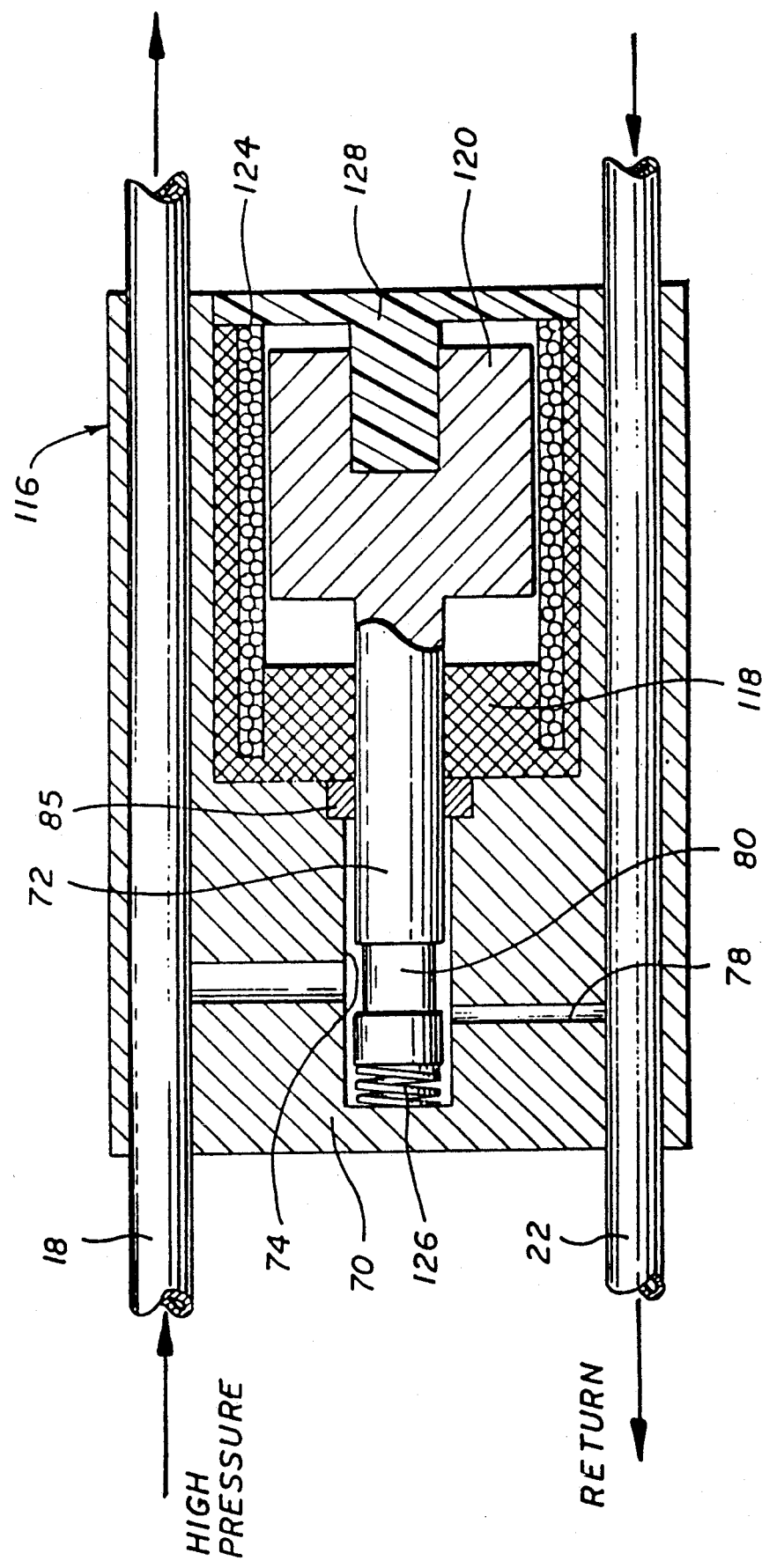
FIG. 8 is a portion of FIG. 3 shown in greater detail in an alternate embodiment thereof.

With reference to FIG. 8, there is shown a proportional solenoid actuator 116 which may be used for the actuator 30 alternatively to the linear actuator 81 of FIG. 4. The proportional solenoid actuator 116 includes a generally cylindrical magnetic flux conductive material case 118, a generally cylindrical magnetic flux conductive material core 120, an electrical current conductive coil 124 and a biasing spring 126. As is well known, a current in the coil 124 will develop magnetic flux axially through the case 118 and the core 120 and across the gap therebetween. The flux in the gap will cause the core 120 to be axially displaced towards the core 118. The bias spring 126 biases the core 120 away from the core 118. The core 120 is mounted in axially slideable engagement to an end cap 128 of nonmagnetic material, as best seen in FIG. 8. The spool 72 may be formed unitarily with the core 120 and supported by the bearing/seal 85.

Figure 9:
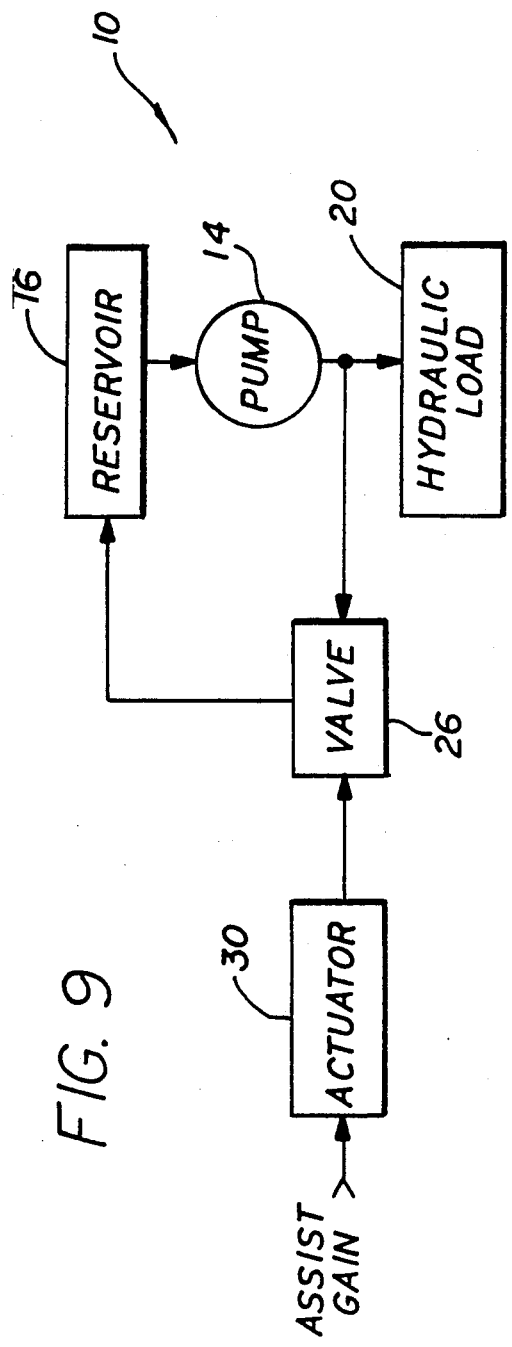
FIG. 9 is a block diagram of an open loop variable assist gain control apparatus for a hydraulic fluid servo assist system.

With reference to FIG. 9, it is seen that the assist gain signal may be applied directly to the actuator 30. In this embodiment, the assist gain signal is used to determine the orific area of the valve 26 in an open loop configuration. Any embodiment of actuator 30 or valve 26 as described hereinabove may be used.

There has been described hereinabove a novel closed loop variable assist gain control apparatus for a hydraulic servo assist system. Those skilled in the art may now make numerous uses of and departures from the above described embodiments of the present invention without departing from the inventive concepts disclosed herein. Accordingly, the present invention is to be defined solely in accordance with the following claims.

What I claim as my invention is:

1. A variable assist gain control apparatus for a servo assist system comprising:
    a valve having an actuated member and a variable flow orifice wherein the position of said actuated member determines the cross sectional area of said orifice, said orifice to communicate hydraulic fluid between a high pressure side of said servo assist system an a low pressure side of said servo assist system, said high pressure side having an operating pressure determined as a function of said area; and
    an actuator responsive to a present state of variable conditions in the environment of said servo assist system to actuate said movable member to a position at which said area of said variable orifice has a dimension to establish said operating pressure substantially at a value preselected to exist upon the occurrence of said present state of said variable conditions.

2. An apparatus as set forth in claim 1 wherein said actuator is an electromagnetic actuator.

3. An apparatus as set forth in claim 2 wherein said electromagnetic actuator is a linear field coil actuator.

4. An apparatus as set forth in claim 3 wherein said field coil actuator includes:
    a core of magnetic flux conductive material having a first face and continuous channel disposed in said first face to define a first wall, a second wall spaced from said first wall, and a bottom wall;
    a first electrical current conductive coil disposed coextensively on said first wall and electrically insulated therefrom and spaced from said first face and said bottom wall and arranged so that an electrical current in said first coil develops magnetic flux in said core and between said first wall and said second wall in a region between said first coil and said first face; and
    a second electrical current conductive coil mounted to said actuated member and disposed in said channel such that an electrical signal developed as a function of said present state of said variable conditions induced in said second coil will enable said actuator to actuate said actuated member to said position.

5. An apparatus as set forth in claim 2 wherein said electromagnetic actuator is a proportional solenoid.

6. An apparatus as set forth in claim 5 wherein said proportional solenoid includes:
    a generally cylindrical case of magnetic flux conductive material, said case having a closed end and an open end, said closed end having a coaxial bore therethrough;

a generally cylindrically shaped core of magnetic flux conductive material disposed in a radially spaced apart relationship within said case and axially displaceable between said open end and said closed end, said core having a elongated rod projecting axially therefrom, said rod being slideably received through said bore, said actuated member being carried by said rod;

a spring having a spring force to bias said core at said open end; and an electrical current conductive coil coaxially disposed within said case and being coextensive with and electrically insulated therefrom, said core being further received within said coil, so that an electrical current in said coil developed as a function of said present state of said conditions will enable said actuator to actuate said actuated member to said position.

7. An apparatus as set forth in claim 1 wherein said valve is a spool valve.

8. A variable assist gain control apparatus for a servo assist system comprising:

a valve having an actuated member and a variable flow orifice wherein the position of said actuated member determines the cross sectional area of said orifice, said orifice to communicate hydraulic fluid between a high pressure side of said servo assist system and a low pressure side of said servo assist system, said high pressure side having an operating pressure determined as a function of said area;

an actuator responsive to a position command signal to actuate said movable member; and a position controller responsive to an assist gain signal developed as a function of the present state of variable conditions in the environment of said servo assist system and a sensed actuator position electrical signal to develop said position command signal as a function of each of said assist gain signal and said sensed actuator position signal, said position command signal being applied to said actuator to actuate said movable member to a position at which said area of said variable orifice has a dimension to establish said operating pressure substantially at a value preselected to exist upon the occurrence of said present state of said variable conditions.

9. An apparatus as set forth in claim 8 wherein said actuator is an electromagnetic actuator.

10. An apparatus as set forth in claim 9 wherein said electromagnetic actuator is a linear field coil actuator.

11. An apparatus as set forth in claim 10 wherein said field coil actuator includes:

a core of magnetic flux conductive material having a first face and continuous channel disposed in said first face to define a first wall, a second wall spaced from said first wall, and a bottom wall;

a first electrical current conductive coil disposed coextensively on said first wall and electrically insulated therefrom and spaced from said first face and said bottom wall and arranged so that an electrical current in said first coil develops magnetic flux in said core and between said first wall and said second wall in a region between said first coil and said first face; and a second electrical current conductive coil mounted to said actuated member and disposed in said channel such that an electrical signal developed as a function of said present state of said variable conditions induced in said second coil will enable said actuator to actuate said actuated member to said position.

12. An apparatus as set forth in claim 9 wherein said electromagnetic actuator is a proportional solenoid.

13. An apparatus as set forth in claim 12 wherein said proportional solenoid includes:

a generally cylindrical case of magnetic flux conductive material, said case having a closed end and an open end, said closed end having a coaxial bore therethrough;

a generally cylindrically shaped core of magnetic flux conductive material disposed in a radially spaced apart relationship within said case and axially displaceable between said open end and said closed end, said core having a elongated rod projecting axially therefrom, said rod being slideably received through said bore, said actuated member being carried by said rod;

a spring having a spring force to bias said core at said open end; and an electrical current conductive coil coaxially disposed within said case and being coextensive with and electrically insulated therefrom, said core being further received within said coil, so that an electrical current in said coil developed as a function of said present state of said conditions will enable said actuator to actuate said actuated member to said position.

14. An apparatus as set forth in claim 8 wherein said valve is a spool valve.

15. An apparatus as set forth in claim 8 wherein said position controller includes:

a position sensor to develop said actuator position signal; and a subtracter to obtain a difference between said assist gain signal and said actuator position signal.

16. An apparatus as set forth in claim 15 wherein said controller further includes a PID compensator electrically in series with said subtracter and said actuator.

17. An apparatus as set forth in claim 16 wherein said controller further includes a power amplifier electrically in series between said compensator and said actuator.

* * * * *